US009032508B2

(12) United States Patent
Chu

(10) Patent No.: US 9,032,508 B2
(45) Date of Patent: May 12, 2015

(54) PATTERN PASSWORD TRAJECTORY CONFIGURATION SYSTEM AND METHOD USING THE SAME

(71) Applicant: Yankey Information Co., Ltd., Taipei (TW)

(72) Inventor: Chun-Yu Chu, Taipei (TW)

(73) Assignee: Yankey Information Co., Ltd., Taipei (TW)

( * ) Notice: Subject to any disclaimer, the term of this patent is extended or adjusted under 35 U.S.C. 154(b) by 0 days.

(21) Appl. No.: 13/915,915

(22) Filed: Jun. 12, 2013

(65) Prior Publication Data
US 2013/0340072 A1    Dec. 19, 2013

(30) Foreign Application Priority Data

Jun. 15, 2012   (TW) ............................... 101121608 A

(51) Int. Cl.
*G06F 7/04* (2006.01)
*G06F 21/36* (2013.01)

(52) U.S. Cl.
CPC ...................................... *G06F 21/36* (2013.01)

(58) Field of Classification Search
CPC . G06F 3/0412; G06F 3/0426; G06F 3/04812; G06F 3/04883; G06F 3/04847; G06F 3/0488; G06F 21/36; G06F 3/04892
USPC .............................................. 726/18; 713/183
See application file for complete search history.

(56) References Cited

U.S. PATENT DOCUMENTS

| 8,127,141 | B2 * | 2/2012 | Hypponen ..................... 713/184 |
| 8,453,221 | B2 * | 5/2013 | Danielsen et al. ................ 726/6 |
| 8,504,842 | B1 * | 8/2013 | Meacham ...................... 713/183 |
| 8,577,356 | B2 * | 11/2013 | Kornilovsky et al. ......... 455/418 |
| 2002/0109677 | A1 * | 8/2002 | Taylor ............................ 345/173 |
| 2002/0188872 | A1 * | 12/2002 | Willeby ......................... 713/202 |
| 2004/0177272 | A1 * | 9/2004 | Walters .......................... 713/201 |
| 2009/0165104 | A1 * | 6/2009 | Danielsen et al. ................. 726/6 |
| 2012/0042378 | A1 * | 2/2012 | Harris ............................. 726/19 |
| 2013/0167221 | A1 * | 6/2013 | Vukoszavlyev et al. ......... 726/16 |

OTHER PUBLICATIONS

Oorshot et al, Purely Automated Attacks on Pass Points-Style Graphical Passwords, Sep. 2010, IEEE, vol. 5, No. 3, pp. 393-405.*
Wilson et al, Pressure-Based Menu Selection for Mobile Devices, Sep. 10, 2010, ACM, pp. 181-190.*

* cited by examiner

*Primary Examiner* — Christopher Brown
*Assistant Examiner* — Jenise Jackson
(74) *Attorney, Agent, or Firm* — Ming Chow; Sinorica, LLC

(57) ABSTRACT

A pattern password trajectory configuration system used in an electronic device with a graphics input interface and a method using the same are provided. The disclosed pattern password trajectory configuration system includes a central processing module, a pattern defining module electronically connected the central processing module for defining the graphics input interface into a central block and multiple blocks neighboring the central block and assigning different data codes to the different blocks neighboring the central block, a sliding direction defining module electronically connected to the central processing module for assigning different prime numbers to define different sliding directions moving along the blocks neighboring the central block, and a touch sequence defining module electronically connected to the central processing module for counting and recording touch sequences of sliding among the blocks neighboring the central block.

8 Claims, 5 Drawing Sheets

PATTERN PASSWORD TRAJECTORY CONFIGURATION SYSTEM AND METHOD USING THE SAME

The current application claims a foreign priority to the patent application of Taiwan No. 101121608 filed on Jun. 15, 2012.

BACKGROUND OF THE INVENTION

1. Field of the Invention

The instant disclosure relates to a pattern password trajectory configuration system and a method using the same, and more particularly, to a pattern password trajectory configuration system and a method using the same on basis of sliding/movement of a cursor indicator for generation of a graphics-based password.

2. Description of Related Art

As electronic devices such as mobile phones, computers, and even televisions have been more and more compact, keyboards or mouse for the electronic devices have been generally replaced by touch-based input means, which is widely adopted in smart phones.

Conventionally, when the mobile phones need to be password-protected inputting passwords via buttons of the mobile phones is necessary to "lock" the mobile phones and such passwords need to be re-inputted when the password-protected mobile phones are to be unlocked. As the a large chunk of the mobile phones are not equipped with the physical keyboards or mouse, systems allowing for human operators to slide in a predetermined direction for unlocking the smart phones have been developed when such sliding could serve as the passwords of the mobile devices. However, the sliding is more of unidirectional and repeated movement or sliding is not permitted for the preparation of the passwords. Plus, the sliding for the generation of the passwords may be based on displayed nine points on user input interfaces, requiring the human operators to slide along the displayed nine points, with the displayed nine points equally distant from one to its neighbors. Accordingly, the passwords prepared could be predictable and more susceptible to unauthorized access with a finite amount of combinations on basis of the nine displayed points.

When the sliding for the preparation or input of the passwords could be based on the repeated movement with sliding trajectory not limited to movement between equally distant points, more combinations of the passwords may result and the preparation or input of the passwords could be quicker and more convenient.

SUMMARY OF THE INSTANT DISCLOSURE

The instant disclosure is directed to a pattern password trajectory configuration system and a method using the same, which enables the repeated movement of cursor indicators on graphics input interface to generate graphics-based passwords.

One objective of the instant disclosure is to replace the traditional input of the passwords, which is generally unidirectional and based on the sliding/movement between equally distant points, by the repeated movement even between the same set of non-equally distant blocks, which may lead to additional combinations of the passwords.

To achieve the aforementioned purpose, a pattern password trajectory configuration system used in an electronic device with a graphics input interface is provided. The disclosed pattern password trajectory configuration system includes a central processing module for controlling operations of the pattern password trajectory configuration system, a pattern defining module electronically connected the central processing module for defining the graphics input interface into a central block and multiple blocks neighboring the central block and assigning different data codes to the different blocks neighboring the central block, wherein the central block is associated with a movable cursor indicator, a sliding direction defining module electronically connected to the central processing module for assigning different prime numbers to define different sliding directions moving along the blocks neighboring the central block, and a touch sequence defining module electronically connected to the central processing module for counting and recording touch sequences of sliding among the blocks neighboring the central block.

The central processing module is adapted to generate a sequence of codes as a password for encrypting data by calculating the data code of the block neighboring the central block where the cursor indicator stays, the sliding direction defined by the prime number, and the touch sequence for the block neighboring the central block when the cursor indicator is dragged from the central block to slide among the blocks neighboring the central block.

More specifically, the pattern password trajectory configuration system may further include a storage module electronically connected to the central processing module for storing the data code of the block neighboring the central block where the cursor indicator stays, the sliding direction, the touch sequence, and the sequence of the codes as the password.

Also, the central processing module may compare the password stored in the storage module and an inputted password before allowing for the encrypted data to be accessed.

The graphics input interface could be a touch screen.

The sliding direction defining module defines the sliding direction based on a starting block and an ending block, with the starting block and the ending block among the blocks neighboring the central block.

The sliding direction is defined to include at least one direction from the starting block.

The sliding direction includes an upward direction, a downward direction, a leftward direction, a rightward direction, a staying-pat, a right-upward direction, a right-downward direction, a left-upward direction, and a left-downward direction.

The sliding among the blocks neighboring the central block is repeatedly performed.

The method using the pattern password trajectory configuration system may include steps of (1) when a cursor indicator is pressed allowing for the cursor indicator to be dragged from a central block to any of blocks neighboring the central block, (2) allowing for the cursor indicator to be slid among the blocks neighboring the central block and recording data codes of the blocks neighboring the central block in sliding, sliding direction codes representative of sliding directions from a starting block to an ending block, with the starting block and the ending block as the blocks neighboring the central block, and a touch sequence for the ending block, and (3) determining a completion of an input of a password and calculating the data code, the sliding direction code, and the touch sequence to generate the password, when the cursor indicator is released and returns to the central block.

The step of calculating the data code, the sliding direction code, and the touch sequence further includes computing the data codes and the sliding direction codes before taking into consideration the touch sequences to generate a sequence of codes.

The method could further arrange the sequence of the codes into the resulting password.

In order to further the understanding regarding the instant disclosure, the following embodiments are provided along with illustrations to facilitate the disclosure of the instant disclosure.

DETAILED DESCRIPTION OF THE EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
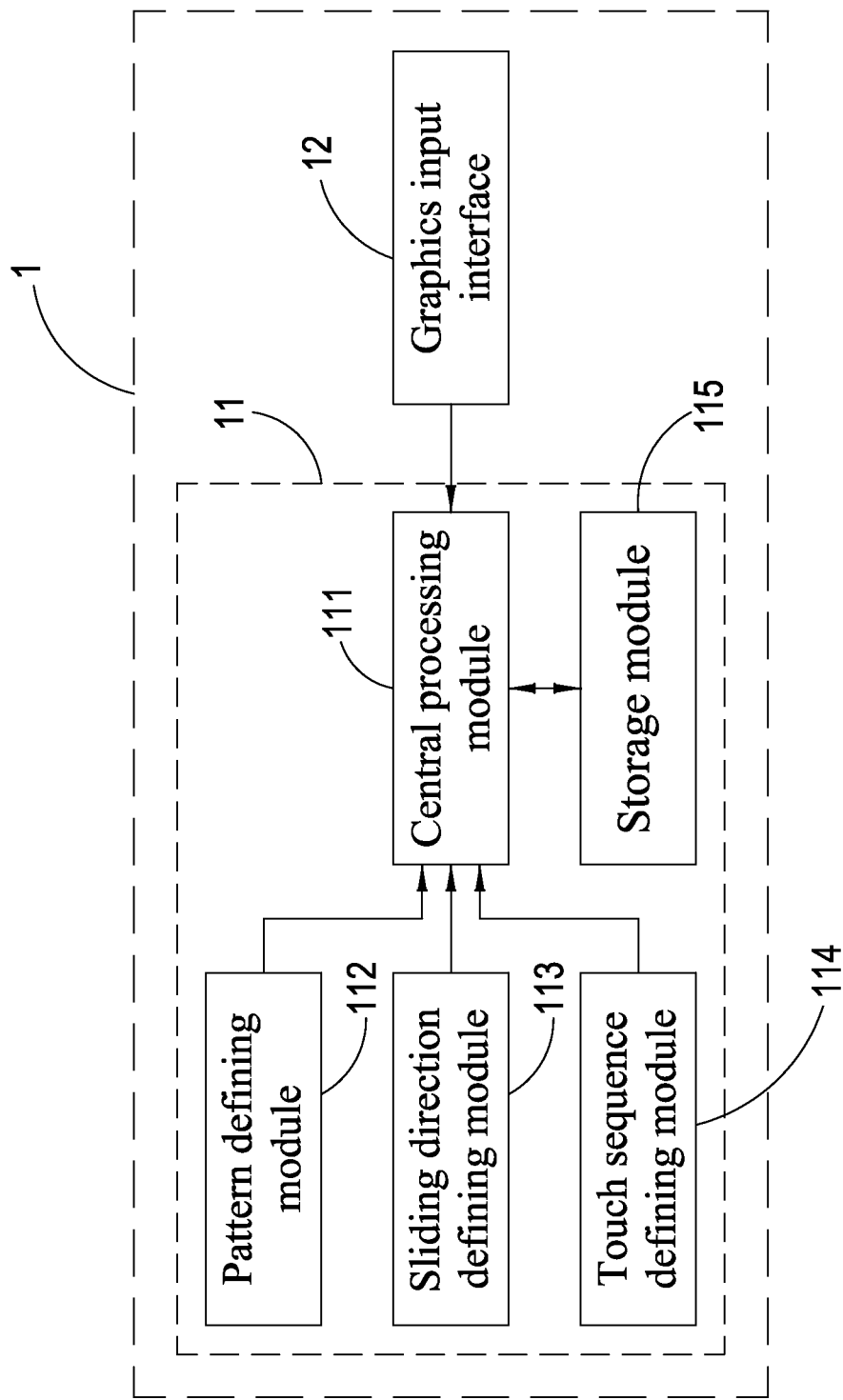
FIG. 1 shows a simplified block diagram showing a pattern password trajectory configuration system used in an electronic device with a graphics input interface according to one embodiment of the instant disclosure.

Please refer to FIG. 1, a block diagram showing a pattern password trajectory configuration system 11 according to one embodiment of the instant disclosure is illustrated. The pattern password trajectory configuration system 11 may be utilized in an electronic device 1 having a graphical input interface 12. The pattern password trajectory configuration system 11 may include a central processing module 111 and a pattern defining module 112 electronically connected to the central processing module 111, which is adapted to be responsible for operations of the pattern password trajectory configuration system 11. The pattern password trajectory configuration system 11 may further include a sliding direction defining module 113, a touch sequence defining module 114, and a storage module 115.

The pattern defining module 112 may define the graphics input interface 12 into one central block and multiple blocks neighboring the central block. For example, the number of the blocks neighboring the central block is eight. It is well understood that the number of the blocks neighboring the central block may vary depending on the size of the graphics input interface 12. The pattern defining module 112 may also assign different data codes to different defined blocks and such data codes may be used to identify where a cursor indicator is when the cursor indicator moves among the blocks neighboring the central block. And the information of the location of the cursor indicator based on the data code associated with the block to which the cursor indicator is moved may be used for representing a password.

The sliding direction defining module 113 meanwhile may be used to assign different prime numbers to sliding directions of the sliding of the cursor indicator among the blocks neighboring the central block. Specifically, when the cursor indicator moves from a starting block to an ending block the sliding direction defining module 113 may assign one prime number to this particular sliding/movement, which is "directional" in its characteristic. And it is worth noting that the starting block and the ending block are among the blocks neighboring the central block. The touch sequence defining module 114 may be used to the sequence of the blocks to which the cursor indicator moves in the process. In other words, the touch sequence defining module 114 may be used to determine the sequence of the blocks neighboring the central block is touched.

The storage module 115 may be adapted to store information such as the data codes associated with the blocks neighboring the central block that are touched in the sliding/movement of the cursor indicator, the sliding direction of the cursor indicator among the blocks neighboring the central block, the touch sequence of those blocks, and the resulting password in the sliding/movement of the cursor indicator.

Figure 2A:
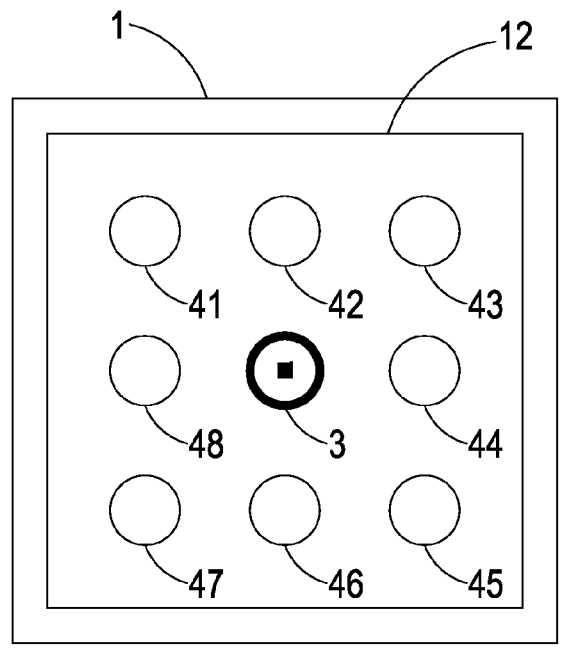
FIGS. 2A-2F show an operation flow of the pattern password trajectory configuration system according to one embodiment of the instant disclosure.

In conjunction with FIG. 1, FIGS. 2A to 2F are used to illustrate one operation flow of the password trajectory configuration system 11 according to one embodiment of the instant disclosure. In FIG. 2A, the graphic input interface 12 of the electronic device 1 has been defined to have one central block where the cursor indicator 3 is located to begin with, and eight blocks 41-48 neighboring the central block. The data codes of the blocks 41-48 neighboring the central block may be set to 1 to 8, respectively. The sliding direction, which may include the upward direction, the downward direction, the leftward direction, the rightward direction, the staying-pat (i.e., the cursor indicator remains unmoved), the right-upward direction, the left-upward direction, the right-downward direction, and the left-downward direction, may be represented in numbers as well. Thus, in one example those directions could be represented as 5, 7, 11, 13, 17, 19, 23, and 29. With the aforementioned example numbers along with the touch sequence of the blocks neighboring the central block, the central processing module may function based on one example principle, which could be the data code of the block neighboring the central block to which the cursor indicator moves times the sliding direction code plus the touch sequence before cursor indicator reaches the ending block.

Figure 2B:
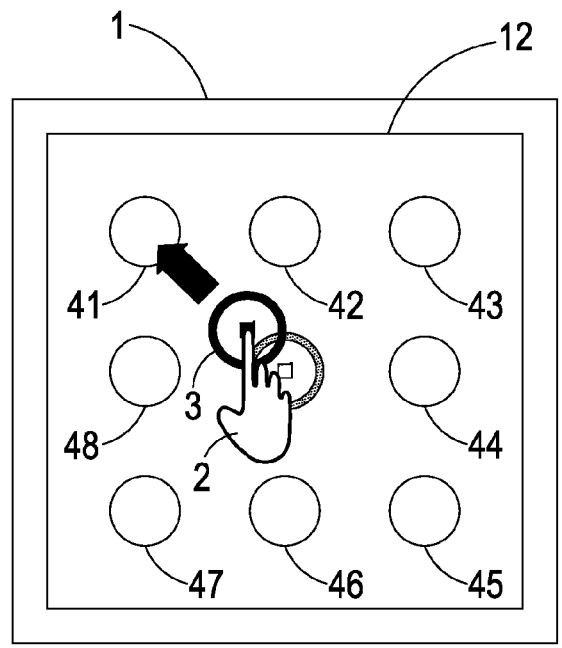
Figure 2C:
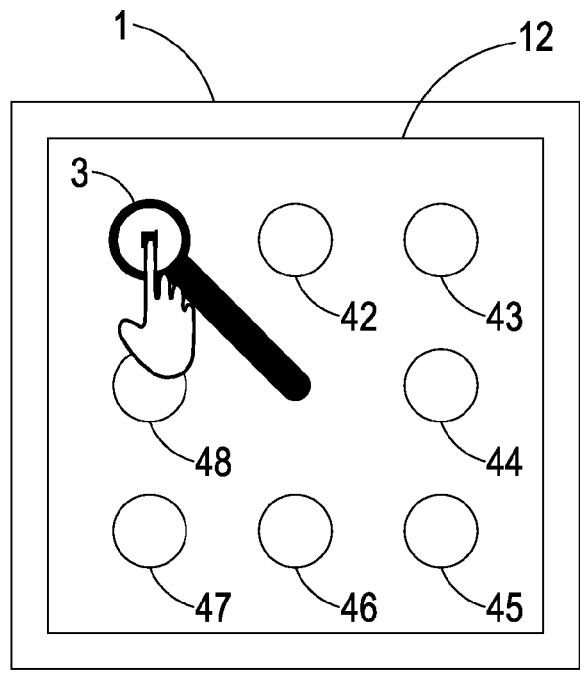

FIGS. 2B-2C show one sliding/movement example for the cursor indicator and the corresponding operation of the central processing module. When the cursor indicator 3 is dragged by a human operator 2 to be moved to the block 41, the central block may become a blank. And when the cursor indicator is within the boundary of the block 41 one single code may be generated. In one implementation, using the previously mentioned example the generated code could be equal to 24, which is result of the data code of the block 41 code (1) times the sliding direction code (23) plus the touch sequence code (1). As such, the movement of the cursor indicator 3 may generate a password of 24.

Figure 2D:
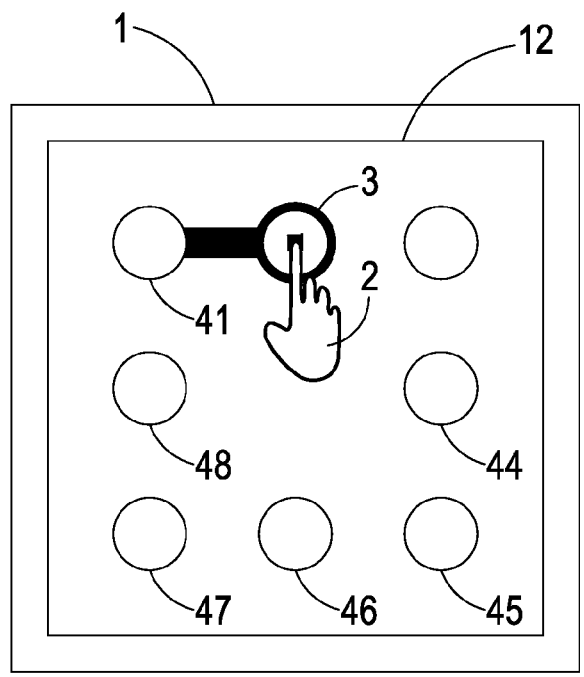

Thereafter, the cursor indicator 3 as shown in FIG. 2D may move from the block 41 to the block 42, which may prompt the pattern password trajectory configuration system 11 to generate another code, which could be equal to 16, resulting from the data code of the block 42 (2) multiplying the sliding direction (7) with the touch sequence (2) added. The password may now be the combination of 24 and 16.

Figure 2E:
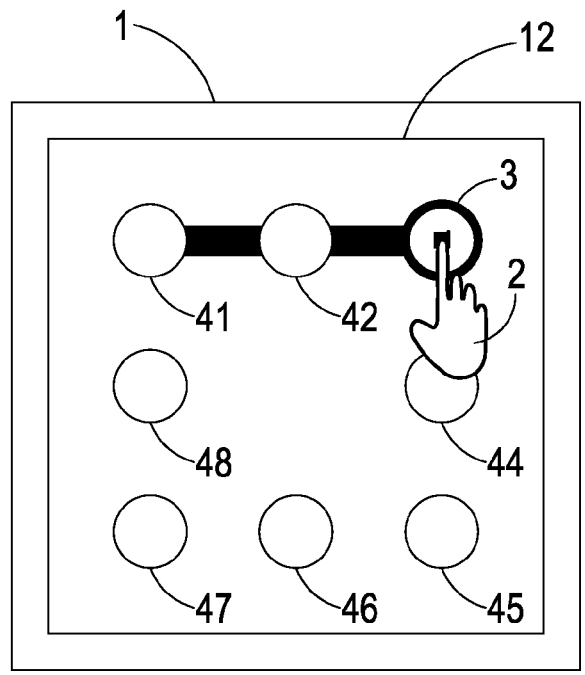

Additionally, as shown in FIG. 2E in which the cursor indicator has moved from the block 42 to the block 43 another code as another password, which may be equal to 24 resulting from the data code of the block 43 (3) multiplying the sliding direction code (7) with the touch sequence code (3). At this point, the password may become the combination of 24, 16, and 24.

Figure 2F:
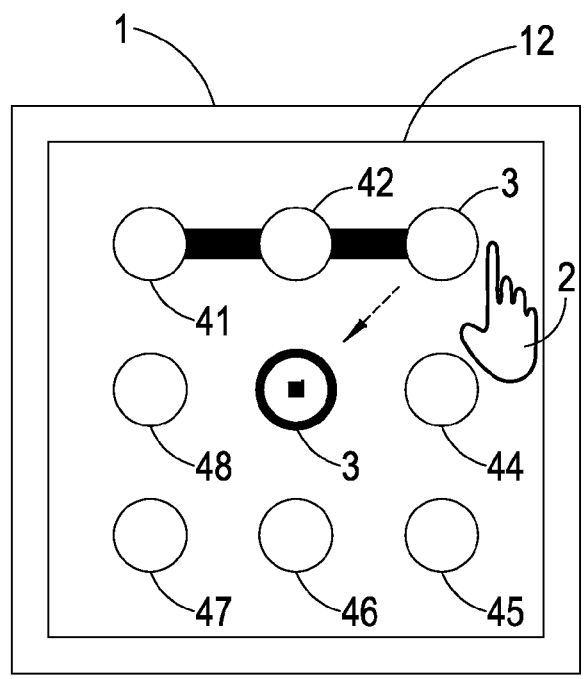

As shown in FIG. 2F, the cursor indicator 3 may be released by the human operator 2 before retuning to the central block, prompting the pattern password trajectory configuration system 11 to conclude that the input of the password has been completed, before the password as the strings of the previously generated passwords in each and every sliding from the starting block to the ending block could be generated. In short, the inputted password may now be 241624.

Figure 3:
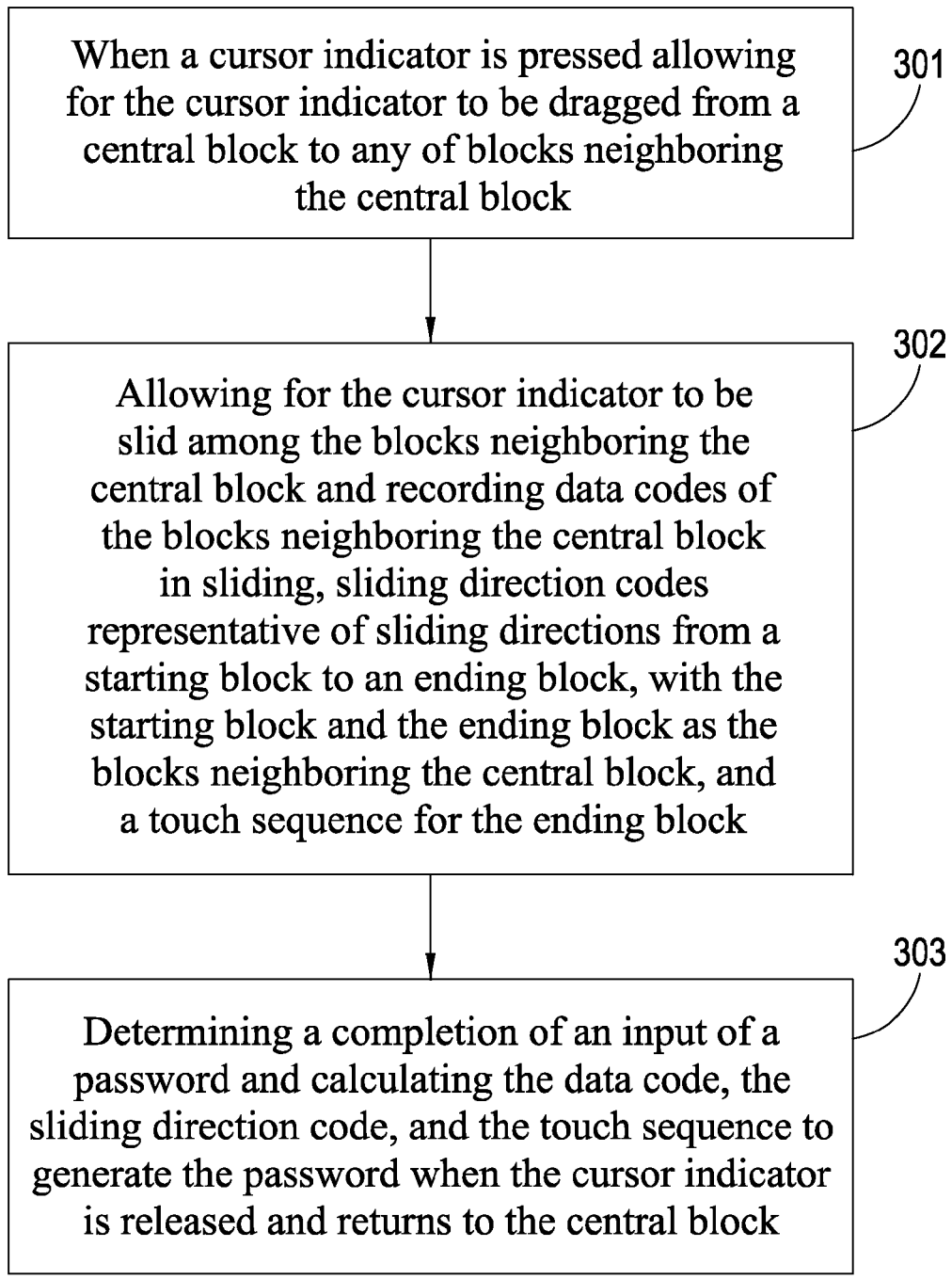
FIG. 3 shows a flow chart of a pattern password trajectory configuration method using the pattern password trajectory configuration system in FIG. 1 according to one embodiment of the instant disclosure.

Further, as shown in FIG. 3, a flow chart of a pattern password trajectory configuration method according to one embodiment of the instant disclosure is provided. The configuration method generally includes when a cursor indicator is pressed allowing for the cursor indicator to be dragged from a central block to any of blocks neighboring the central block (step 301), allowing for the cursor indicator to be slid among the blocks neighboring the central block and recording data codes of the blocks neighboring the central block in sliding, sliding direction codes representative of sliding directions from a starting block to an ending block, with the starting block and the ending block as the blocks neighboring the central block, and a touch sequence for the ending block (step 302), and determining a completion of an input of a password and calculating the data code, the sliding direction code, and the touch sequence to generate the password, when the cursor indicator is released and returns to the central block.

Advantages of the pattern password trajectory configuration system and the method using the same include (1) enhanced strength of the password since any movement from the defined central block and the blocks neighboring the central block could lead to the code constituting the resulting password, which is more convenient and efficient from the password input perspective and could prevent the password from being peeped by only requiring the human operator to "draw" graphics on the user input interface of the electronic device, which could be easier for the human operator to memorize his/her password when compared with the textual-based password, and (2) better password protection in secrecy and complexity as the process of creating the password could be relatively quicker, leave little trace (trajectory of touch), and the resulting password (string of codes) is less susceptible to being accessed.

The descriptions illustrated supra set forth simply the embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A pattern password trajectory configuration system used in an electronic device with a graphics input interface, comprising:
  a hardware processor;
  a memory for storing a central processing module, a pattern defining module, a sliding direction defining module, and a touch sequence defining module executed by the hardware processor;
    the central processing module controlling operations of the pattern password trajectory configuration system;
    the pattern defining module being electronically connected with the central processing module;
    the pattern defining module defining the graphics input interface into a central block and multiple blocks neighboring the central block, and assigning different data codes to the different blocks neighboring the central block;
    the central block being associated with a movable cursor indicator;
    the sliding direction defining module being electronically connected to the central processing module;
    the sliding direction defining module assigning different prime numbers to define different sliding directions moving along the blocks neighboring the central block;
    the touch sequence defining module being electronically connected to the central processing module; and
    the touch sequence defining module counting and recording touch sequences of sliding among the blocks neighboring the central block;
    wherein the central processing module generates a sequence of codes as a password for encrypting data by calculating the data code of the block neighboring the central block where the cursor indicator stays, the sliding direction defined by the prime number, and the touch sequence for the block neighboring the central block when the cursor indicator is dragged from the central block to slide among the blocks neighboring the central block.

2. The pattern password trajectory configuration system according to claim 1, the memory further storing a storage module; the storage module being electronically connected to the central processing module; the storage module storing the data code of the block neighboring the central block where the cursor indicator stays, the sliding direction, the touch sequence, and the sequence of the codes as the password.

3. The pattern password trajectory configuration system according to claim 2, wherein the central processing module compares the password stored in the storage module and an inputted password before allowing for the encrypted data to be accessed.

4. The pattern password trajectory configuration system according to claim 1, wherein the graphics input interface is a touch screen.

5. The pattern password trajectory configuration system according to claim 1, wherein the sliding direction defining module defines the sliding direction based on a starting block and an ending block, with the starting block and the ending block among the blocks neighboring the central block, into a corresponding sliding direction code.

6. The pattern password trajectory configuration system according to claim 5, wherein the sliding direction is defined to include at least one direction from the starting block.

7. The pattern password trajectory configuration system according to claim 1, wherein the sliding direction includes an upward direction, a downward direction, a leftward direction, a rightward direction, a staying-pat, a right-upward direction, a right-downward direction, a left-upward direction, and a left-downward direction.

8. The pattern password trajectory configuration system according to claim 1, wherein the sliding among the blocks neighboring the central block is repeatedly performed.

* * * * *